Figure 1:
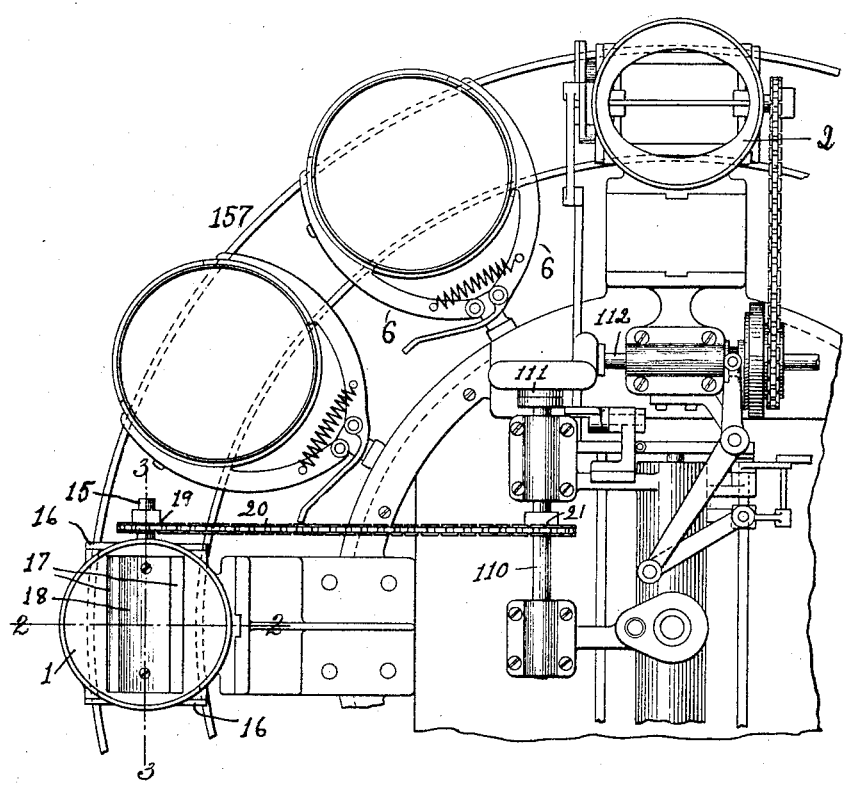

No. 782,874. PATENTED FEB. 21, 1905.
F. G. PENNOCK.
WEIGHING AND PACKAGING MACHINE.
APPLICATION FILED APR. 8, 1904.

Witnesses:
H. B. Davis.
M. M. Piper.

Inventor:
Frederick G. Pennock
by Angus & Harriman
Attys

No. 782,874.                                                    Patented February 21, 1905.

UNITED STATES PATENT OFFICE.

FREDERICK G. PENNOCK, OF SOUTH BRAINTREE, MASSACHUSETTS, ASSIGNOR, BY MESNE ASSIGNMENTS, TO PNEUMATIC SCALE CORPORATION LIMITED, A CORPORATION OF MAINE.

WEIGHING AND PACKAGING MACHINE.

SPECIFICATION forming part of Letters Patent No. 782,874, dated February 21, 1905.

Application filed April 8, 1904. Serial No. 202,153.

*To all whom it may concern:*

Be it known that I, FREDERICK G. PENNOCK, of South Braintree, county of Norfolk, State of Massachusetts, have invented an Improvement in Weighing and Packaging Machines, of which the following description, in connection with the accompanying drawings, is a specification, like characters on the drawings representing like parts.

This invention relates to weighing and packaging machines of the class known as "double-hopper" machines. In these machines the general mode of operation is to fill the package partially under one hopper, transfer it onto a scale-beam beneath the second hopper, and then by a small stream complete the load to the required weight. The advantages of this class of double-hopper machines are that the packages may be filled with both greater speed and accuracy than with machines employing only a single hopper, because after the preliminary rapid filling from the first hopper there only remains to be added a small amount of material, thus permitting high speed in operation, and this material is allowed to flow in through a small stream, thus securing great accuracy. The first machine of this class of automatic weighing-machines is shown in the patent to Tuck and Merritt, No. 461,651, dated October 20, 1891. While Tuck and Merritt were the first to employ a double-hopper machine of this character, they show in their patent as embodying their broad invention a mechanism which may be properly called one species of the general class of "double-hopper" machines. In this species of machines the package under the first hopper receives a predetermined quantity of material measured by its volume or bulk. It is to this species of machines that my invention belongs, and I have employed the principle of the Tuck and Merritt patent, but have made such improvements thereon as greatly to increase the speed and accuracy of the machine. Another species of the class of double-hopper machines is that shown and described in the patent to Watson, No. 633,675, dated September 26, 1899, in which machine the package under the first hopper receives the material, which is measured by allowing the stream to flow into the package for a predetermined length of time. This predetermined length of time is determined by the amount of rotation of a shaft in the machine. Although the Watson machines of this second species have been put into actual operation, they nevertheless contain certain defects which are obviated in my invention, because I do not use a timed opening for my first hopper, but have developed and improved upon the prior expedients for delivering a quantity of material measured by its bulk or volume to the package when under the first hopper. The difficulty inherent in the machines having a timed opening in the first hopper is that it has been found practically impossible to provide for accurately controlling the speed of the shaft by which the time of closing of the hopper is determined, since this speed will vary according to the use of the machinery in the factory, and an increase or decrease of but one revolution or a portion thereof of the shaft per minute will materially change the period in which the flow continues and seriously interfere with the accuracy of the amount of goods delivered from the first hopper, with the result that adjustments of the machine are required.

In the use of the class and species of double-hopper machines to which my invention and that of Tuck and Merritt relate it has been found undesirable to dump the whole amount of material into the package under the first hopper at one time, as is done in the specific machine shown in the Tuck and Merritt patent, because with such light materials as soap-powders the single mass of material deposited in the package cannot displace the air therein without being violently scattered in all directions by the displaced air. I have obviated this difficulty by providing the first hopper with a delivery device which measures off from the material in the hopper a predetermined volume and delivers it to the package beneath the hopper and by providing means for operating said delivering device a predetermined number of times. By this means the package beneath the hopper is filled by delivering into it a number of quantities of material measured by their volume or bulk.

It is immaterial to my invention how much time it occupies in delivering the material to the package under the first hopper, so long as the time is short enough to meet commercial requirements, but, on the contrary, my invention consists in delivering a predetermined number of small quantities of material measured by their bulk or volume successively into the package, whereby the difficulties inherent in delivering an amount determined by a timed opening or an amount in one volume are eliminated and the speed and accuracy of the machine as a whole thereby increased.

The machine herein shown for the purpose of illustrating my invention is the machine shown in Patent No. 720,008, dated February 10, 1903.

Figure 2:
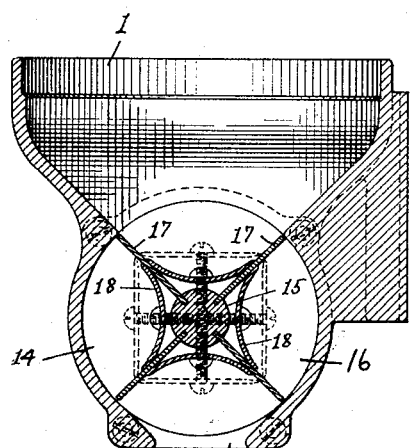
Figure 3:
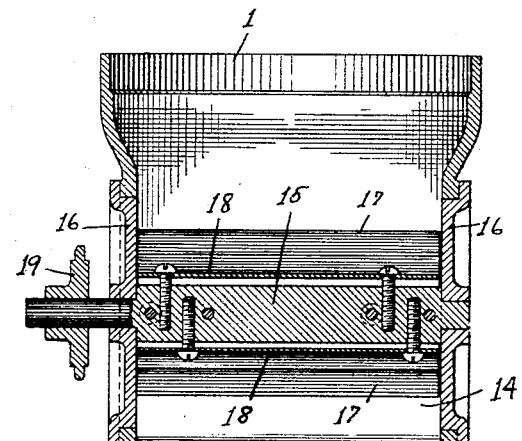

Figure 1 shows in plan view a sufficient portion of the weighing and packaging machine shown in the patent aforesaid provided with my improvements to illustrate my invention. Fig. 2 is a transverse vertical section of the hopper through which the material is fed to partially fill the package, taken on the dotted line 2 2, Fig. 1, having means embodying my invention for repeatedly delivering small measured quantities of material to the package; and Fig. 3 is a longitudinal vertical section of the hopper and delivering device, taken on the dotted line 3 3, Fig. 1.

The hopper 1, of any suitable size and shape, is provided at its lower end with a chamber 14 of cylindrical form, in which turns the operating member of a delivering device, said chamber having an opening 13 at the bottom, which serves as an exit. The opposite ends of the cylindrical chamber are closed by circular or other shaped plates 16. The operating member of the delivering device consists of a horizontal shaft 15, having its bearings in said end plates 16, and a plurality of blades 17, which are secured to and project radially from said shaft, the outer edges of said blades terminating as close as possible to the curved wall of the chamber, so as to work freely, yet provide a powder-tight joint. The several spaces between the blades, in conjunction with the walls of the chamber, form compartments of a measured or predetermined cubic capacity, which receive the material from the hopper 1 and deliver it at the exit 13, and as the shaft 15 revolves measured quantities of material are successively delivered to any package or receptacle placed beneath the exit 13. To vary the cubic capacities of the compartments, and thereby vary the measured quantities which will be successively delivered, bottom plates 18 are placed between the blades, which are herein shown as spring-acting plates secured to the shaft 15 by screws or other means, which pass through the plates at points intermediate their width and into the shaft, the side edges of said plates bearing upon the blades, and as the screws are turned in said plates will be bent more or less to thereby increase the size of the compartment, and as said screws are turned out said plates will straighten, and thereby decrease the size of the compartments.

As a means of rotating the shaft 15 a sprocket-wheel 19 is secured to one end of said shaft, over which passes a sprocket-chain 20, which passes around a sprocket-wheel 21, secured to a shaft 110, which is connected by a clutch 111 and suitable bevel-gears with a driving-shaft 112. The shaft 110 is designed to or may make one revolution and then stop, and the sprocket-wheel 21 thereon will be proportioned relatively to the sprocket-wheel 19, so that the shaft 15 on the delivering device will make two revolutions, or it may be a fraction more or less. Different sizes of sprocket-wheels will be placed in the shafts 15 and 110, as may be required. If the shaft 15 makes two complete revolutions, then eight measured quantities will be successively delivered; but by substituting other sprocket-wheels or turning the shaft 110 more or less than one revolution or fraction thereof any number of measured quantities more or less than eight may be delivered.

The package or receptacle is moved along on circular tracks 157, provided for it, from a position beneath hopper 1 to a position beneath the hopper 2 by any suitable means provided for the purpose—as, for instance, the packages or receptacles are held by clamps 6, which are attached to an intermittingly-movable ring and by said ring are moved from beneath the first hopper to a position beneath the second hopper. The means herein shown for holding and moving the packages or receptacles from the first to the second hopper is substantially the same as shown in Patent No. 720,008, before referred to. The delivery of the material from said hopper 2 is controlled by means of any suitable construction—such, for instance, as shown in said Patent No. 720,008—adapted to be operated by the weight of the filled package.

I do not desire to limit my invention to the particular form of delivering device herein shown, as I desire to properly include within the spirit and scope of my invention any form of delivering device constructed and arranged to successively deliver measured quantities of material when combined with means for operating it whereby a predetermined number of said measured quantities will be delivered.

Having thus described my invention, what I claim as new, and desire to secure by Letters Patent, is—

In a package-filling machine, the combination of two hoppers which discharge successively into the same package, a delivering device for one of said hoppers, constructed and arranged to successively deliver measured quantities of material, and means for operating said delivering device to successively deliver a predetermined number of said measured quantities, means for moving the package or receptacle to the other hopper, and means for controlling the delivery of material from said last-named hopper, substantially as described.

In testimony whereof I have signed my name to this specification in the presence of two subscribing witnesses.

FREDERICK G. PENNOCK.

Witnesses:
B. J. NOYES,
H. B. DAVIS.